United States Patent [19]

Hellsten et al.

[11] 4,315,755
[45] Feb. 16, 1982

[54] HYDROCARBON OILS CONTAINING 1 TO 10 PERCENT EMULSIFIED WATER AND EMULSIFIERS THEREFOR

[75] Inventors: Karl M. E. Hellsten, Ödsmål; Inger G. Johansson, Svanesund; Birgit T. G. Karlsson, Stenungsund, all of Sweden

[73] Assignee: Berol Kemi A.B., Stenungsund, Sweden

[21] Appl. No.: 164,101

[22] Filed: Jun. 30, 1980

[30] Foreign Application Priority Data

Jun. 29, 1979 [SE] Sweden .................................. 7905716

[51] Int. Cl.³ .............................................. C10L 1/32
[52] U.S. Cl. .......................................................... 44/51
[58] Field of Search .................... 44/51; 252/353, 351, 252/DIG. 1

[56] References Cited

U.S. PATENT DOCUMENTS 2,920,948  1/1960  Weeks .................................... 44/51
3,490,237  1/1970  Lissant ................................... 44/51
3,540,866  11/1970 Miller .................................... 44/51

Primary Examiner—Winston A. Douglas
Assistant Examiner—Y. Harris-Smith

[57] ABSTRACT

Hydrocarbon oils containing 1 to 10% emulsified water are provided, having as the emulsifier:

(a) a nonionic surface-active ethylene oxide adduct having the general formula:

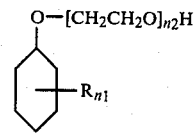

in which:

$n_1 = 1$ to 5;

$n_2 =$ a number selected to give a polyethylene glycol chain in a weight percent within the range from about 50 to about 60% by weight of the adduct;

R = alkyl of from about one to about twenty-four carbon atoms, the alkylphenyl group having from about twelve to about thirty carbon atoms; and (b) the calcium salt of dodecylbenzene sulphonic acid.

The weight ratio nonionic surface-active ethylene oxide adduct to calcium salt of dodecylbenzene sulphonic acid is from about 80:20 to about 40:60. The emulsifier emulsifies from 1 to 10% by weight of water in the hydrocarbon oil.

11 Claims, No Drawings

HYDROCARBON OILS CONTAINING 1 TO 10 PERCENT EMULSIFIED WATER AND EMULSIFIERS THEREFOR

Much work has been done with the objective of incorporating small amounts of water in fuel oil and heating oils for use in oil burners and in diesel engines. The water decreases the combustion temperature, which in turn reduces carbon and ash deposits on the heating surfaces. In diesel engines a decrease in nitrogen oxide emissions in the exhaust gases is achieved, leading to lower air pollution, of great importance in mining and in heavy city traffic.

Earlier work has sought to produce a microemulsion of water in oil, i.e., a thermodynamically stable system. However, this has required the addition of the same amount of surface-active agent as the water, which economically is unacceptable.

In accordance with the present invention, hydrocarbon oils containing 1 to 10% emulsified water are provided, having as the emulsifier:

(a) a nonionic surface-active ethylene oxide adduct having the general formula:

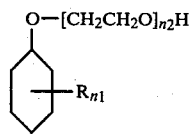

in which:

$n_1 = 1$ to 5;

$n_2 = $ a number selected to give a polyethylene glycol chain in a weight percent within the range from about 50 to about 60% by weight of the adduct;

$R = $ alkyl of from about one to about twenty-four carbon atoms, the alkylphenyl group having from about twelve to about thirty carbon atoms; and (b) the calcium salt of dodecylbenzene sulphonic acid.

The weight ratio nonionic surface-active ethylene oxide adduct to calcium salt of dodecyl benzene sulphonic acid is from about 80:20 to about 40:60.

The concentration of the emulsifier in the hydrocarbon oil is adjusted to the amount of water to be emulsified therein. Normally, the emulsifier is present in a concentration within the range from about 0.5 to about 5 grams per liter of the emulsion. The amount of water can be as much as fifty times the amount of emulsifier, by weight.

Especially good properties are shown by emulsifiers in which $n_2$ is so chosen that the polyethylene oxide chain represents 52 to 58% by weight of the ethylene oxide adduct, and in which the weight ratio of nonionic surface-active ethylene oxide adduct to calcium salt of dodecylbenzene sulphonic acid is within the range from about 40:60 to about 65:45.

The handling and incorporation of the calcium dodecyl benzene sulphonate can be facilitated by dissolving it in a polar organic solvent, for example, butanol.

The hydrocarbon oil preferably is a fuel oil for use in diesel engines, gas turbine engines, or heating oil burners and systems. The invention thus is applicable to the following fuel oils:

TABLE I

| Product | Application | Refinery stream used |
|---|---|---|
| Diesel fuel oils | | |
| Grade No. 1-D | Mobile service such as trucks, railroad and submarines; high-speed engines with wide variations in loads and speeds; low-temperature service | Straight-run fractions including kerosene to intermediate distillations from paraffinic crude or treated fractions from mixed-base crudes |
| Grade No. 2-D | Industrial and heavy mobil service; high-speed engines with high loads and uniform speeds | Similar to Grade No. 1-D but with lower volatility |
| Grade No. 4-D | Large stationary installations; engines with sustained loads and constant speeds | Residual fuel oils blended with more viscous distillates |
| Gas-turbine fuel oils | | |
| Grade No. 1-GT | Suitable for nearly all gas turbines; not primarily for aircraft use | Light distillates including some gas oil fractions |
| Grade No. 2-GT | Gas turbines not requiring the clean burning characteristics of Grade No. 1-GT | Heavier distillates than Grade No. 1-GT |
| Grade No. 3-GT | Gas turbines operating at gas inlet temperatures below 1200° F.; usually requires fuel heating equipment | Residual fuel that meets the low ash requirements |
| Fuel oils | | |
| No. 1 (kerosene, range oil) | Vaporizing pot-type burners | Straight-run distillate; treated for stability |
| No. 2 | General-purpose domestic fuel for atomizing-type burners | Straight-run or catalytically cracked distillates |
| No. 4 | Light industrial installations not equipped with | Heavier straight-run and catalytically |

TABLE I-continued

| Product | Application | Refinery stream used |
|---|---|---|
| | preheating facilities | cracked distillates; light residual fuels |
| No. 5 | Burners capable of handling heavier fuels than No. 4 fuel oils; may require preheating | Residual fuel with some lighter distillates |
| No. 6 (bunker C) | Burners with preheaters permitting high-viscosity fuels | Straight-run or cracked residuums |

The nonionic surface-active ethylene oxide adducts are known and available. If specific adducts are required, they can be manufactured in a conventional way by reacting ethylene oxide in prescribed amounts with the corresponding alkylphenols in an alkaline medium. The alkylphenols may be mono-, di-, tris-, tetra-, or pentaalkyl substituted, and contains a total of from twelve to thirty carbon atoms. Examples of suitable alkylphenols are dibutylphenol, tributylphenol, octylphenol, dioctylphenol, nonylphenol, dinonylphenol, and dodecylphenol. Especially good properties are shown by dinonylphenol, to which an average of nine moles ethylene oxide has been added, per mole dinonylphenol.

Exemplary R alkyl include methyl, ethyl, propyl, isopropyl, butyl, isobutyl, tert-butyl, amyl, tert-amyl, hexyl, isohexyl, tert-hexyl, heptyl, octyl, isooctyl, tert-octyl, 2-ethylhexyl, nonyl, isononyl, tert-nonyl, decyl, isodecyl, dodecyl, tetradecyl, hexadecyl, octadecyl, behenyl, and eicosyl.

Exemplary nonionic polyoxyethylene alkyl phenol adducts include:

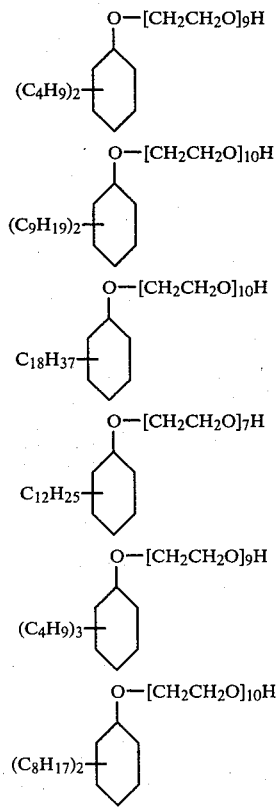

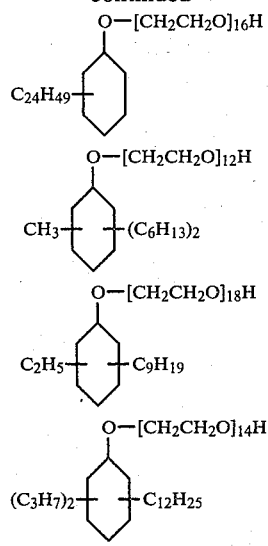

The hydrocarbon oil compositions of the invention are prepared by blending the emulsifier and water with the hydrocarbon oil. After thorough mixing, such compositions are stable against phase separation for up to twenty minutes.

If desired, the emulsifier can be mixed with the hydrocarbon oil in advance, and then mixed with the water just prior to use, or shortly before.

Preferred embodiments of the invention are illustrated in the Examples.

EXAMPLES 1 TO 4

A nonionic surface-active ethylene oxide adduct (obtained by reacting 1 mole dinonylphenol with 9 moles ethylene oxide in alkaline medium) and a 62% solution of calcium dodecylbenzene sulphonate in n-butanol were dissolved in 78 grams heating oil of Swedish Standard No. 1 in the amounts stated in Table II below. To the solution was then added 5 ml of water of a hardness of 1.2° dH, and the mixture was homogenized for fifteen seconds by mechanical stirring. The quality of the emulsion obtained was evaluated according to a scale from 1 to 5, where the rating 1 stands for a very coarse emulsion, and the rating 5 for a very fine one. The emulsion was then observed for half an hour, and the time for separation into a clear oil phase or a clear water phase was recorded. The observed time was called the stability time. Table II shows the result of a set of tests carried out with different mixture ratios of the nonionic surface-active ethylene oxide adduct and the calcium dodecylbenzene sulphonate.

For comparison, ethylene oxide adducts outside the scope of the invention were also tested. They were obtained by adding 6 moles ethylene oxide to 1 mole dinonylphenol (Control A), and 14 moles ethylene oxide to 1 mole dinonylphenol (Control B), respectively.

TABLE II

| Example No. | Weight Ratio ethylene oxide adduct to calcium dodecylbenzene-sulphonate | Added amount emulsifier (gram) | Emulsion Appearance | Stability time, min |
|---|---|---|---|---|
| 1 | 41:59 | 0.1 | 4 | 20 |
| 2 | 52:48 | 0.1 | 4 | 20 |
| 3 | 57.43 | 0.1 | 5 | 30 |
| 4 | 62:38 | 0.1 | 5 | 25 |
| Control | | | | |
| A | 62:38 | 0.1 | 4 | 5 |
| B | 62:38 | 0.1 | 2 | 2 |

From the results, it is evident that the emulsifiers in accordance with the invention have an excellent emulsifying effect, and are superior to the emulsifiers A and B in the Controls.

EXAMPLES 5 TO 8

In the same manner as in Examples 1 to 4, the emulsifying ability of emulsifiers was examined, where the nonionic surface-active ethylene oxide adduct was the reaction product of 1 mole nonylphenol with 6 moles ethylene oxide. For comparison, tests were also carried out on reaction products of 1 mole nonylphenol with 4 moles ethylene oxide (Control C) and 1 mole nonylphenol with 7 moles ethylene (Control D). The results are reported in Table III:

TABLE III

| Example No. | Weight ratio ethylene oxide adduct to calcium dodecylbenzene-sulphonate | Added amount emulsifier (gram) | Emulsion Appearance | Stability time, min |
|---|---|---|---|---|
| 5 | 41:59 | 0.5 | 4 | 20 |
| 6 | 52:48 | 0.5 | 5 | 30 |
| 7 | 62:38 | 0.5 | 5 | 25 |
| 8 | 52:48 | 0.2 | 5 | 30 |
| Control | | | | |
| C | 52:48 | 0.2 | 4 | 4 |
| D | 52:48 | 0.2 | 3 | 3 |

From the results it is evident that the emulsifiers according to the invention are definitely superior to the emuslifiers in Controls C and D.

EXAMPLES 9 TO 12

In the same manner as in Examples 1 to 4, the emulsifying ability of the following emulsifiers was tested:

| Example 9 | Reaction product of 1 mole tributylphenol with 8 moles ethylene oxide. |
| Example 10 | Reaction product of 1 mole dinonylphenol with 8 moles ethylene oxide. |
| Example 11 | Reaction product of 1 mole nonylphenol with 10 moles ethylene oxide. |
| Example 12 | Reaction product of 1 mole dinonylphenol with 11 moles ethylene oxide. |

| Control E | Reaction product of 1 mole dinonylphenol with 6 moles ethylene oxide. |
| Control F | Reaction product of 1 mole dinonylphenol with 14 moles ethylene oxide. |

The following results were obtained:

TABLE IV

| Example No. | Weight ratio ethylene oxide adduct to calcium dodecylbenzene-sulphonate | Added amount emulsifier (gram) | Emulsion Appearance | Stability time, min |
|---|---|---|---|---|
| 9 | 52:48 | 0.1 | 5 | 20 |
| 10 | 79:21 | 0.1 | 5 | 17 |
| 11 | 52:48 | 0.1 | 5 | 25 |
| 12 | 52:48 | 0.1 | 5 | 18 |
| Control | | | | |
| E | 62:38 | 0.1 | 4 | 5 |
| F | 62:38 | 0.1 | 2 | 2 |

All the emulsifiers of the invention have a surprisingly good emulsifying effect, in comparison with the Controls E and F.

Having regard to the foregoing disclosure, the following is claimed as patentable and inventive embodiments thereof:

1. A hydrocarbon oil containing 1 to 10% emulsified water comprising:
   (a) a nonionic surface-active ethylene oxide adduct having the general formula:

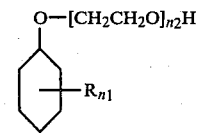

in which:
   $n_1 = 1$ to 5;
   $n_2 =$ a number selected to give a polyethylene glycol chain in a weight percent within the range from about 50 to about 60% by weight of the adduct; and
   R = alkyl of from about one to about twenty-four carbon atoms, the alkylphenyl group having from about twelve to about thirty carbon atoms; and
   (b) the calcium salt of dodecylbenzene sulphonic acid; the weight ratio nonionic surface-active ethylene oxide adduct to calcium salt of dodecyl benzene sulphonic acid being within the range from about 80:20 to about 40:60.

2. A hydrocarbon oil according to claim 1 in which n is chosen so that the amount of polyethylene glycol chain is from 52 to 58% by weight of the ethylene oxide adduct.

3. A hydrocarbon oil according to claim 1 in which the alkylphenyl is dinonylphenyl.

4. A hydrocarbon oil according to claim 1 in which the weight ratio of nonionic surface active ethylene oxide adduct to calcium salt of dodecylbenzene sulphonic acid is within the range from 40:60 to 65:45.

5. A hydrocarbon oil according to claim 1 in which the amount of adduct is within the range from about 0.5 to about 5 grams per liter of the emulsion.

6. A hydrocarbon oil according to claim 1 in which the hydrocarbon oil is a diesel fuel oil.

7. A hydrocarbon oil according to claim 1 in which the hydrocarbon oil is a heating oil.

8. A composition for emulsifying up to 10% water in hydrocarbon oils, comprising:

(a) a nonionic surface-active ethylene oxide adduct having the general formula:

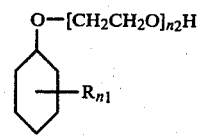

in which:

$n_1 = 1$ to 5;

$n_2 =$ a number selected to give a polyethylene glycol chain in a weight percent within the range from about 50 to about 60% by weight of the adduct;

$R =$ alkyl from about one to about twenty-four carbon atoms, the alkylphenyl group having from about twelve to about thirty carbon atoms; and (b) the calcium salt of dodecylbenzene sulphonic acid; the weight ratio nonionic surface-active ethylene oxide adduct to calcium salt of dodecyl benzene sulphonic acid being from about 80:20 to about 40:60.

9. A composition according to claim 8 in which n is chosen so that the amount of polyethylene glycol chain is from 52 to 58% by weight of the ethylene oxide adduct.

10. A composition according to claim 8 in which the alkylphenyl is dinonylphenyl.

11. A composition according to claim 8 in which the weight ratio of nonionic surface-active ethylene oxide adduct to calcium salt of dodecylbenzene sulphonic acid is within the range from 40:60 to 65:45.

* * * * *